INVENTOR
BRIAN HOWARD ROGERS

BY Larson and Taylor

ATTORNEYS

United States Patent Office 3,199,578
Patented Aug. 10, 1965

3,199,578
AIR CONDITIONING SYSTEM FOR GROUND
EFFECT MACHINES
Brian Howard Rogers, Yeovil, England, assignor to
Normalair Limited, Yeovil, England
Filed July 8, 1963, Ser. No. 293,333
Claims priority, application Great Britain, July 14, 1962,
27,141/62
5 Claims. (Cl. 165—44)

This invention relates to an air conditioning system for ground effect machines, whereby enclosures of the machines may be provided with control of the atmosphere therein, such that optimum conditions for the comfort of personnel, the carriage of freight and/or installed equipment of temperature sensitive nature can be maintained. Because of obvious space and weight limitations in machines of this type, it is essential that such systems be compact, easily removable, light in weight, simple but reliable, and that they be adapted to utilize features already inherent in such machines to the extent possible.

The development of ground effect machines has now reached the point where they constitute a competitive and economical mode of commercial transport. Obviously the unique capabilities of these ground effect machines render them a most obvious form of transportation in undeveloped regions of desert, plains and extensive water, where extremes of temperature usually prevail. Thus air conditioning systems for these machines must be adaptable to operate satisfactorily under a wide range of conditions.

Accordingly, it is an object of this invention to provide an air conditioning system for ground effect machines, which is robust, uncomplicated, efficient and economical, and which will provide suitably conditioned and regulated air to maintain conditions of comfort for occupants of the machine and also to maintain atmospheric conditions suited to the needs of freight and/or specialized equipment.

It is a further object of this invention to provide an air conditioning system for ground effect machines incorporating a closed circuit vapor-cycle refrigeration system, including a condenser, wherein the condenser coolant is provided from the supply of pressurized air which supports the machine.

It is a further object of this invention to provide an air conditioning system as set forth in the preceding paragraph and which includes selectively engageable alternate drive means for driving the refrigerant compressor of the refrigeration system during intermediate stops of the machine, and for driving auxiliary means for circulating coolant through the condenser during such stops or at any other time when the supply of pressurized supporting air becomes unavailable.

It is a further object of the invention to provide an air conditioning system for ground effect machines which includes a closed circuit heating system of the liquid type, wherein the heating liquid comprises the coolant for an internal combustion engine, and wherein the cooling radiator for the engine coolant comprises a heat exchanger utilizing a portion of pressurized supporting fluid as the heat exchanger coolant.

It is a further object of the invention to provide an air conditioning system for ground effect machines which incorporates variable heating and cooling circuits, and wherein the condenser coolant for the cooling circuit is provided by the pressurized air for supporting the machine, and wherein said pressurized air then passes through a heat exchanger in the heating circuit.

Finally, it is an object of this invention to provide an air conditioning system for a ground effect machine including heating and cooling systems, one or both of the systems being easily removable from the machine for repair or replacement, or for independent installation, the systems utilizing as components thereof features already existent in the machine to the extent possible.

Further objects and advantages of the invention will become readily apparent from the following detailed description with reference to the accompanying drawings, wherein.

Figure 1:
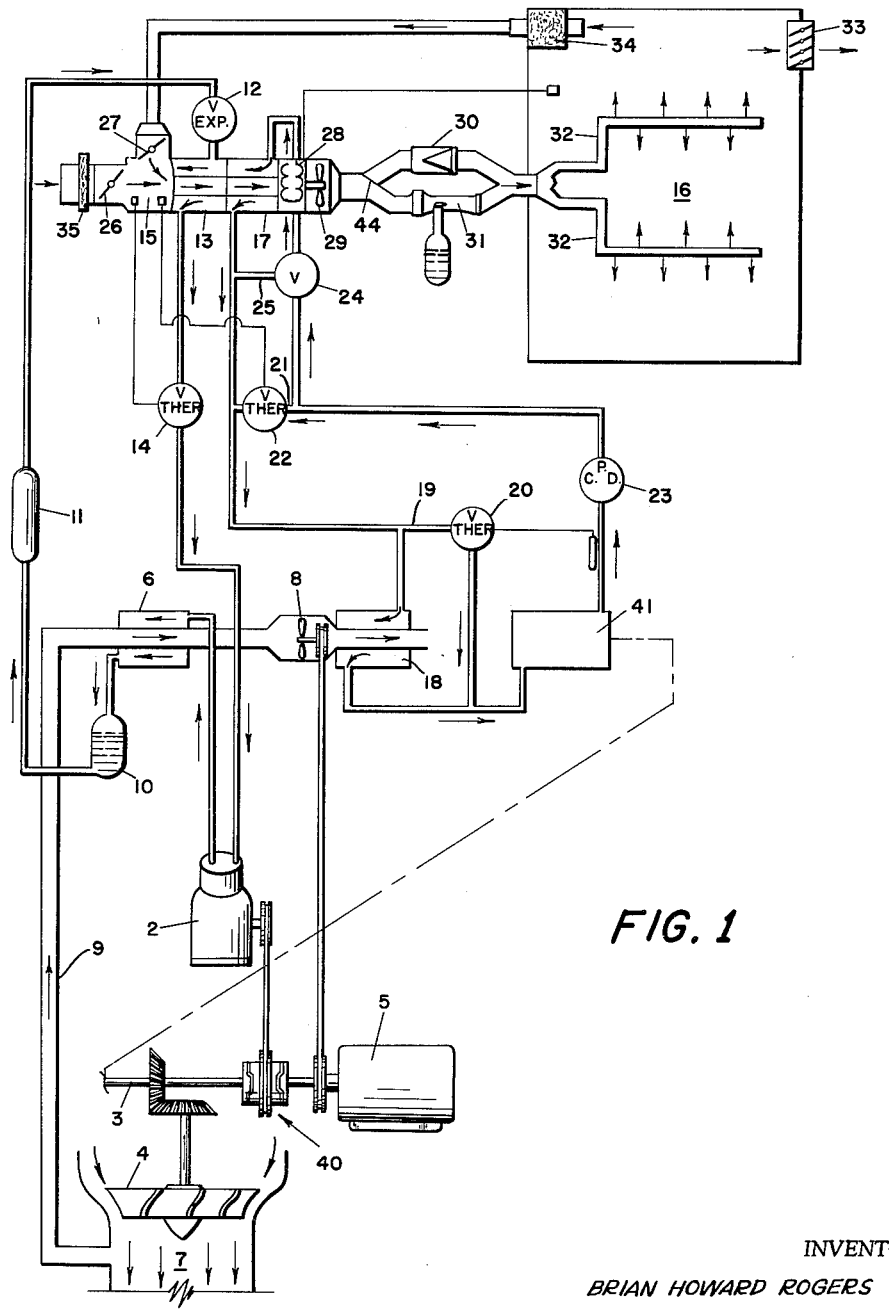
FIG. 1 is a schematic illustration of a preferred embodiment of the invention.

In one arrangement of the invention according to a preferred embodiment, which is by way of example only, a large capacity blower 4 provides air for supporting a ground effect machine in a manner well known in the art. The air passes from the blower 4 through a supporting air passage 7 to the underside of a machine, the particular details of which form no part of the instant invention. The blower 4 is driven by way of appropriate gearing and shaft 3 by a power plant 41, shown in this instance as being of the internal combustion, water cooled type. However, it will be understood that the blower 4 need not be driven by the particular engine 41, but rather separate power plants could be provided. The particular driving arrangement shown does, however, permit the system to be more compact and of lighter weight. The air conditioning system includes a closed vapor-cycle refrigeration circuit comprising a compressor 2, a refrigerant condenser 6, and an evaporator 13. The refrigerant passes from the compressor 2 through the condenser 6 to a liquid receiver 10 and a drier 11. The liquid receiver and drier can be any of several know types, and the particular purpose of the receiver 10 is to increase the capacity of the circuit. An expansion valve 12 of a known type is included in the circuit immediately prior to the evaporator 13. A thermostatically controlled valve 14 is incorporated between the evaporator 13 and the compressor 2, and controls the circuit in response to air temperatures in mixing chamber 15 at the inlet of the evaporator 13.

The compressor 2 is driven by the shaft 3 through a selectively engageable mechanism 40, so as to permit the shaft to be disengaged from the compressor, for instance, when the engine 41 has been stopped. An alternative drive means in the form of a motor 5 of any convenient type is also selectively engageable with the mechanism 40 for driving the compressor 2 when the shaft 3 from the power plant 41 is disengaged.

In the embodiment shown in the drawings, a duct 9 leads a portion of the machine supporting fluid to serve as the coolant for condenser 6. Because of the pressure and velocity of the air in passage 7, normally there is no need for additional propelling means to circulate the air through the duct 9 and condenser 6. A fan 8 is provided in duct 9 downstream of the condenser 6 to circulate the air coolant through the condenser when the supply of supporting air is unavailable, for instance, during intermediate stops when the blower 4 is not operating. As shown in FIG. 1, the fan 8 is conveniently driven by the alternative driving motor 5, since in normal operation the fan 8 will be needed during the same time when the motor 5 is driving the refrigerant compressor 2.

The evaporator 13 communicates at its air inlet with a mixing chamber 15, which preferably has inlets for connection to the atmosphere and the enclosure of the ground effect machine, the two inlets being controlled by adjustable valves 26 and 27, respectively. Fillers 35 and 34 are provided to filter the air entering the mixing chamber from these two sources. The air from these two sources passes through the evaporator 13 in heat exchange relationship with the expanding refrigerant fluid from the expansion valve 12, thus serving to cool the incoming air. As previously mentioned, the thermostatic valve 14 controls the operation of the refrigeration circuit in response to temperatures sensed in the mixing chamber 15.

The heating system is of the closed liquid circuit type, and in the embodiment shown in FIG. 1 the heating liquid comprises the coolant for the power plant 41. The hot coolant passes from the power plant 41 and is propelled by a pump 23 to the heat exchanger 17, which is located adjacent to and communicates with the air outlet from the evaporator 13. The heating fluid passes through heat exchanger 17 in heat exchange relationship with the incoming air, and returns to the power plant 41 through a heat exchanger 18, which corresponds generally to the radiator for the power plant or engine 41. An extension of the duct 9 from the condenser 6 passes through the heat exchanger 18, and cools the heating fluid to a desired level before it is returned to the power plant 41. A bypass 19 controlled by a thermostatic valve 20 responsive to the temperature at the engine coolant outlet returns the heating fluid directly to the power plant 41 when the outlet temperature falls below a desired level. A thermostatically controlled valve 22 serves to divert some or all of the heating fluid from the heat exchanger 17 in response to air temperatures in mixing chamber 15. Two-way valve 24 and bypass conduit 25 provide isolation of the heating circuit from the main system. A thermostatically regulated electrical supplementary heating means 28 is interposed in the air stream downstream of the heat exchanger 17. While it is preferred that the power plant or engine 41 serve as the heat source for the heating fluid so as to economize on weight, other auxiliary engines or sources of heat can be utilized.

A fan 29 is located downstream of the supplementary heating means 28 to impel the air from the mixing chamber into the enclosure 16 of the ground effect machine. An excess water extractor 30 and a humidifier 31 of known types are provided to further condition the air passing into enclosure 16. A selector valve 44 diverts the incoming air through either the extractor or the humidifier. Delivery ducts and louvers for the enclosure are schematically shown at 32, and the enclosure is provided with variable vents 33 for passing air from the enclosure.

Figure 2:
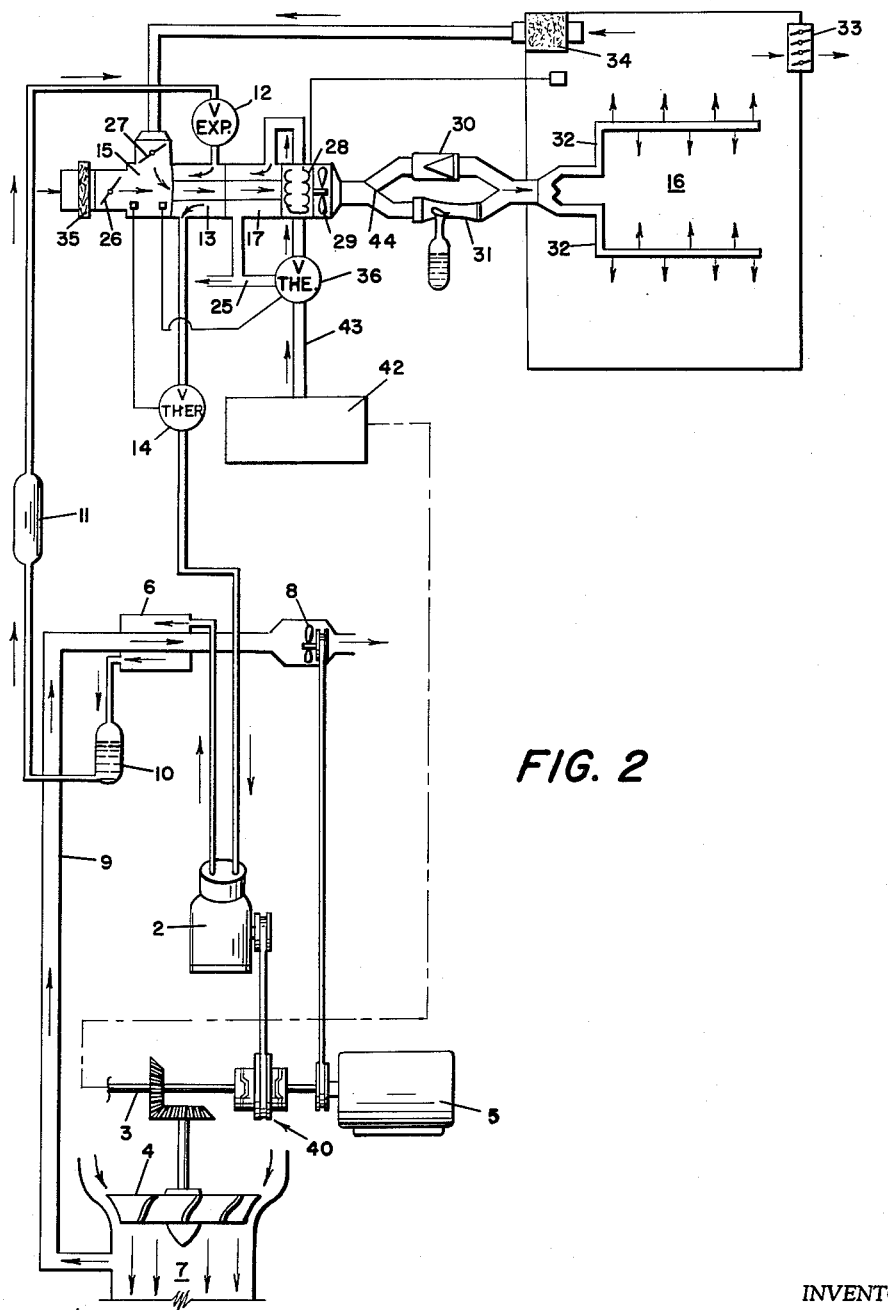
FIG. 2 is an illustration of a modification of the system shown in FIG. 1, wherein alternate heating means are used.

An alternative arrangement of the system is disclosed in FIG. 2 wherein, while the major part of the system is unaltered, the heating circuit differs in that the heat is provided by extracting it from hot air bled from a compressor of a gas turbine power unit, and is controlled by thermostatic valve 36 sensing temperature in the mixing chamber 15. Thus a compressor of a gas turbine power unit of a known type is shown at 42, and a bleed line 43 leads the hot air from the compressor to the heat exchanger 17, though which it passes in heat exchange relationship with the air from the mixing chamber 15. The bypass is shown at 25, and is controlled by the thermostatic valve 36.

The supplementary heating means may augment the primary heating system, but under normal conditions they will serve primarily to heat the enclosures during periods when the engines are stopped, for instance, while the machine makes interstage stops for loading and off-loading. Electrical power is provided by external sources or by batteries of the machine itself in any of several manners well known in the art. When required, the refrigerant circuit is operated during interstage stops by the disengagement of the main drive and engagement of the alternative or auxiliary drive means to continue operation of the compressor and to commence operation of the auxiliary fan 8, as shown in FIG. 1.

In operation, according to the preferred embodiment of FIG. 1, ambient air and/or recirculation air are drawn into the mixing chamber 15 through filters 35 and 34, respectively, by action of the fan unit 29 to pass through the evaporator 13, therein being cooled as and if required, thence through heat exchanger 17 to be heated as and if required, these two temperature controlling actions being interrelated and automatically governed. The air then proceeds through the supplementary heating means 28, the fan unit 29, a water extractor 30 or the humidifier 31, and then into the delivery ducts 32. The cooling system functions by way of refrigerant being compressed in compressor 2, which is driven normally from the power plant 41 through shaft 3, or during interstage stops of the machine, by the alternative or auxiliary drive means 5. The refrigerant passes through condenser 6 to be cooled by heat exchange with the supporting air from the main blower 4 through duct 9, then into liquid receiver 10, through drier 11, through expansion valve 12, and into evaporator 13 where heat is absorbed from the air to be delivered to enclosure 16. The expanded refrigerant passes from the evaporator 13 through a thermostatic valve 14, which is controlled in response to air temperatures in mixing chamber 15. Exclusion of the cooling circuit from the main system, if desired, is achieved by disengaging the mechanism 40, similarly to disengagement during interstage stops of the machine.

The heating circuit of the system functions by conducting the engine coolant through a pump 23, which ensures adequate flow around the circuit, then through a two-way valve 24 prior to entering the heat exchanger 17, where it cools upon transferring heat to air passing therethrough to enclosure 16. The coolant next passes to the radiator 18 where it is further cooled by heat exchange with supporting air from the blower 4 and passage 7 delivered by way of condenser 6. Heat dissipation to the air applied to the enclosure is controlled by circumvention of heat exchanger 17 by way of a bypass 21 regulated by thermostatically controlled valve 22 responsive to temperature variations within the mixing chamber 15. In order that maximum temperature of the coolant may be maintained within acceptable limits of engine operation, there is provided a bypass 19 of the radiator which is regulated by thermostatically controlled valve 20. Isolation of the heat exchanger 17 when the cooling circuit is required to be operated can be manually arranged by diverting the engine coolant through bypass 25 by way of two-way valve 24. The supplementary heating means is regulated by a thermostat responsive to temperatures sensed in the enclosure 16. Further switch means can be provided to prevent operation during functioning of the cooling circuit.

By either automatic or manual selection of the settings of valves 26 and 27 of the mixing chamber 15, it is possible to provide the enclosure with either ambient air or recirculation air or any mixture of the two, and by varying the settings of vent means 33 of the enclosure 16 the number of fresh air changes can be controlled.

It will be readily apparent to those skilled in the art that numerous modifications and refinements may be made without departing from the spirit of the invention. It is to be clearly understood that the particular details shown in the drawings are by way of example only and are not to be taken as limiting the invention, the scope of which is intended to be limited only by the subjoined claims. For instance, it will be appreciated that the refrigerant compressor may be driven by electric motor, internal combustion engine or turbo means, and not directly by a main engine of the machine. However, a simpler alternative drive means is rendered possible by having the compressor driven normally by one of the existing engines on the machine. Also, it is not essential that the radiator of the engine coolant circuit be cooled by air dischraged through the condenser, although the simplicity of such an arrangement possesses substantial merit, but rather the coolant for the radiator could be supplied directly from the blower 4 or passage 7. By utilizing a portion of this existing pressurized air, the entire system is rendered simpler, more efficient, and more reliable.

Having thus fully described the invention in the manner required by the patent statutes, I claim:

1. In combination with a ground effect machine having an enclosure and having means for supplying pressurized air for supportnig the machine, an air conditioning system for the enclosure, comprising: a closed circuit vapor-cycle refrigeration circuit having a refrigerant compressor, a refrigerant condenser, and an evaporator; means for passing air to the enclosure through said evaporator to be cooled thereby; said condenser having an inlet and an outlet for coolant fluid; and means communicating said coolant inlet with the supply of pressurized air so as to have the supporting air function as the condenser coolant.

2. In a ground effect machine, blower means for supplying pressurized fluid for supporting the machine; motor means for driving said blower means; a closed vapor-cycle refrigeration circuit having a refrigerant compressor, a refrigerant condenser, and an evaporator; means for passing air to be cooled through said evaporator to selected areas of the machine; passage means for passing a portion of the pressurized supporting air through said condenser to serve as the condenser coolant; means for detachably connecting said motor means to drive said refrigerant compressor; auxiliary means for passing coolant through said refrigerant condenser when the supply of pressurized supporting air is rendered unavailable; and alternate drive means detachably connected for driving said compressor and said auxiliary means when said motor means is disconnected from said compressor.

3. Apparatus as set forth in claim 2, further comprising: means responsive to the air temperature at the air inlet of said evaporator for controlling the flow of refrigerant through said evaporator; heating means interposed in the air path between said evaporator and the selected areas; second means responsive to the air temperature at the air inlet of said evaporator for controlling said heating means, a fluid-cooled internal combustion engine; means for passing the engine coolant fluid to said heating means to serve as the heat source therefor; means for returning the engine coolant fluid to said internal combustion engine means, heat exchange means interposed in said last-mentioned means for further cooling said engine coolant; and means for passing coolant air from said refrigerant condenser through said heat exchange means to serve as the coolant therefor.

4. Apparatus as set forth in claim 3, further comprising: means for bypassing said engine coolant around said heat exchange means from the upstream side to the downstream side thereof; and means responsive to the engine coolant temperature for controlling the flow through said bypass.

5. Apparatus as set forth in claim 4 wherein said internal combustion engine comprises said motor means for driving said blower means.

References Cited by the Examiner

UNITED STATES PATENTS

| | | | |
|---|---|---|---|
| 1,943,969 | 1/34 | Hulse | 165—23 |
| 2,083,585 | 6/37 | Winther | 165—27 |
| 2,193,837 | 3/40 | Winther et al. | 165—23 X |
| 2,388,210 | 10/45 | Hanson et al. | 165—43 X |
| 3,066,753 | 12/62 | Hurley et al. | 180—7 |
| 3,097,504 | 7/63 | Quick et al. | 62—241 |

CHARLES SUKALO, *Primary Examiner.*